US008775250B2

(12) United States Patent
Murphy et al.

(10) Patent No.: US 8,775,250 B2
(45) Date of Patent: *Jul. 8, 2014

(54) MONETARY DISTRIBUTION OF BEHAVIORAL DEMOGRAPHICS AND FAN-SUPPORTED DISTRIBUTION OF COMMERCIAL CONTENT

(71) Applicant: EarDish Corporation, Studio City, CA (US)

(72) Inventors: Daniel Patrick Murphy, Coronado, CA (US); Rod Underhill, Julian, CA (US)

(73) Assignee: EarDish Corporation, Studio City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,126

(22) Filed: Aug. 23, 2013

(65) Prior Publication Data

US 2013/0339110 A1      Dec. 19, 2013

Related U.S. Application Data

(62) Division of application No. 12/967,987, filed on Dec. 14, 2010, now Pat. No. 8,543,452.

(60) Provisional application No. 61/286,456, filed on Dec. 15, 2009.

(51) Int. Cl.
　　*G06Q 30/00*　　　(2012.01)
　　*G06Q 30/02*　　　(2012.01)

(52) U.S. Cl.
　　CPC ........ *G06Q 30/0242* (2013.01); *G06Q 30/0207* (2013.01); *G06Q 30/0251* (2013.01); *G06Q 30/0236* (2013.01)
　　USPC ................... 705/14.41; 705/14.1; 705/14.36; 705/14.49

(58) Field of Classification Search
　　CPC .......... G06Q 30/0207; G06Q 30/0251; G06Q 30/0236; G06Q 30/0242
　　USPC ....................... 705/14.1, 14.36, 14.41, 14.49
　　See application file for complete search history.

(56) References Cited

U.S. PATENT DOCUMENTS

| 8,291,446 B2 * | 10/2012 | Kennedy ......................... 725/13 |
| 2002/0059640 A1 * | 5/2002 | Rafizadeh ...................... 725/135 |
| 2002/0122059 A1 * | 9/2002 | Kuroda .......................... 345/748 |
| 2004/0133468 A1 * | 7/2004 | Varghese ........................ 705/14 |
| 2007/0113243 A1 * | 5/2007 | Brey ............................... 725/32 |
| 2007/0192784 A1 * | 8/2007 | Postrel .......................... 725/23 |
| 2008/0077535 A1 * | 3/2008 | Cannici ......................... 705/80 |
| 2008/0281945 A1 * | 11/2008 | Gill et al. ..................... 709/219 |
| 2009/0254934 A1 * | 10/2009 | Grammens ..................... 725/14 |

OTHER PUBLICATIONS

William Strunk, Jr., and E. B. White, The Elements of Style, $3^{rd}$ Edition, all pages, 1979.*

* cited by examiner

*Primary Examiner* — Calvin Cheung
(74) *Attorney, Agent, or Firm* — Klarquist Sparkman, LLP (57) ABSTRACT

A method includes identifying a media file for distribution and identifying a plurality of commercial messages as possible content that can be associated with the media file when it is distributed. Votes from a plurality of customers can be received, with each vote reflecting a customer's preference for at least one of the plurality of commercial messages. The votes can be calculated and at least one preferred commercial message can be designated based on the calculation. At least one preferred commercial message can be associated with the media file to create a combined media file and the combined media file can be distributed and/or made available for distribution.

6 Claims, 9 Drawing Sheets

MONETARY DISTRIBUTION OF BEHAVIORAL DEMOGRAPHICS AND FAN-SUPPORTED DISTRIBUTION OF COMMERCIAL CONTENT

CROSS REFERENCE TO RELATED APPLICATION

This application is a divisional of U.S. patent application Ser. No. 12/967,987, filed Dec. 14, 2010, now U.S. Pat. No. 8,543,452, issued Sep. 24, 2013, which claims the benefit of priority to U.S. Provisional Application No. 61/286,456, filed on Dec. 15, 2009, both of which are incorporated herein by reference in their entirety.

FIELD

The present disclosure is directed to methods and systems for providing and distributing commercial content in combination with media files that are provided to customers.

BACKGROUND

Many musicians and bands currently have a presence on various social networking websites. Conventional social networking websites allow bands to introduce their music to current and potential fans. Such websites, however, do not provide musicians and bands with specific, geographically based demographics relating to their fans and the commercial interests of their fans. Nor do such websites allow musicians and bands to distribute their music in a manner that allows them to be compensated for the distribution, while at the same time allowing fans to receive the music for free, at a reduced cost, or to generate incremental revenue on a per engagement basis.

SUMMARY

In one embodiment, a method of providing customer-supported advertising is provided. The method comprises identifying a media file for distribution and identifying a plurality of commercial messages as possible content that can be associated with the media file when it is distributed. Votes from a plurality of customers can be received, with each vote reflecting a customer's preference for at least one of the plurality of commercial messages. The votes can be calculated and at least one preferred commercial message can be designated based on the calculation. At least one preferred commercial message can be associated with the media file to create a combined media file and the combined media file can be distributed and/or made available for distribution.

In some embodiments, the media file and the commercial messages comprise audio files. In others, the media file and the commercial messages comprise video files. When the media file comprises a video that exceeds twenty minutes in length when played back in its designated viewing medium, two or more preferred commercial messages can be associated with the media file based on the votes received from the plurality of customers. In some embodiments, the combined media file is distributed free of charge to the plurality of customers. In other embodiments, customers must register prior to voting, with registration step including obtaining personal and/or geographic information about each customer. In some embodiments, the combined media file is distributed free of charge only to the registered customers.

In some embodiments, the plurality of commercial messages identified as possible commercial content comprise commercial messages created by one or more of the registered customers. In other embodiments, a number of viewings of the commercial message by registered customers is calculated and a reward is provided to a registered customer that views the commercial message in the combined media file a predetermined amount of times. The reward can be a free copy of the media file without the commercial message.

In another embodiment, a method for providing rewards to customers for supporting commercial messages is provided. The method includes registering a plurality of customers by obtaining personal and/or geographic information about each customer and associating that information with a unique username. A voting forum can be provided for the registered customers to vote on their preferred commercial messages. In some embodiments, the voting forum is an Internet website. Votes can be received from the registered customers, with each vote reflecting a customer's preference for one of a plurality of commercial messages. The votes can be calculated and a preferred commercial message can be designated based on the calculation. The preferred commercial message can be associated with a media file to create a combined media file and the combined media file can be made available for free distribution.

In some embodiments, the media file and the commercial messages comprise audio files. In others, the media file and the commercial messages comprise video files. In other embodiments, the plurality of commercial messages can comprise commercial messages created by one or more of the registered customers. The combined media file can be distributed to one or more of the registered customers and a number of viewings of the commercial message by the one or more registered customers that it is distributed to can be calculated. A reward can be provided to the one or more registered customers after they have viewed the commercial message a predetermined amount of times. The reward can include providing the registered customers with free copies of the media file without the commercial message and/or with cash incentives (e.g., incremental cash rewards).

In some embodiments, the method also includes distributing the combined media file to one or more of the registered customers. The registered user can be permitted to forward the combined media file to unregistered users and whether the unregistered users view the commercial message can be tracked. A reward can be provided to each customer that forwarded the combined media file to unregistered users that viewed the commercial message.

In another embodiment, one or more computer-readable storage media storing computer-executable instructions for causing a computer to perform a method is provided. The method comprises registering a plurality of customers by obtaining personal and/or geographic information about each customer and associating that information with a unique username. In addition, voting information is received from the registered customers, the voting information including a selection of one or more commercial messages by registered customers. A first designated commercial message can be selected based on the voting information and that commercial message can be associated with a media file to create a combined media file.

In another embodiment, the method can include receiving one or more customer-created commercial messages from the registered customers. The one or more commercial messages available for selection by the registered customers can include the customer-created commercial messages. In some embodiments, the combined media file can be distributed to one or more registered users. In other embodiments, the method can include selecting a second designated commercial message based on the voting information and associating the second designated commercial message with the media file. Accordingly, the combined media file includes at least the first and second designated commercial messages.

In one embodiment, systems and methods for tracking and monitoring users registered in a system is provided. This tracking and monitoring can be used to provide quantifiable end-user data directly to bands and industry professionals. In some embodiments, a current, online collection and storage structure for identifying end-user behavioral patterns can be combined with a revenue share allocation to transform abstract demographics into concrete, verifiable and continuous results that can be acted upon monetarily by the registered users (e.g., a fan) and the subscribing clients (e.g., a band).

In one embodiment, the system comprises a web-based computer system that collects individual registered user's behavioral demographic information. The web-based computer system may allow a plurality of subscribing clients to access the collected consumer preference information. The behavioral demographic database may include demographic profile information for each registered user, such as, the registered user's zip code, city, country, user name, user password, user e-mail address, gender, age-bracket, music preference, and listening trend per song or per video, etc. In addition, the behavioral demographic database may allow subscribing clients to track and quantify behavioral patterns of a registered user by location specific methodology to target products and services specific to the registered users. Further, the web-based computer system may attract web-specific advertisers based on the volume of registered users collectively, through the frequency of use by the registered users on the web-based computer system. In addition, based on a plurality of registered users and frequency of usage for a set period of time, which may be verifiable and repeatable, the web-based computer system may derive advertising revenue. A percentage allocation of advertising revenue derived from the web-based computer system may accumulate from registered users' usage for a set period of time. The frequency of usage from a single registered user may be quantified based on a ranking system that tracks registered users for a repeatable set of time. Consequently, the web-based computer system may determine a monetary compensation awarded to each ranking registered user based on a gross advertising revenue derived from a set period of time on a percentage basis and may compensate the top rank individual users in each ranking category with a percentage of the gross advertising revenue derived from the web-based computer system during the set period of time.

In certain embodiments, the registered users (e.g., fans) may monitor their respective ranking for a set period of time and may receive a percentage of the website advertising revenue, based on the ranking of that individual relative to a plurality of registered users. In addition, subscribing clients (e.g., bands) may utilize the geographically based demographics to promote their respective fan-base to industrial professionals or tailor their road-show and promotional tours according to their geographical fan-base. Free membership registration may be required for both the Fans and Bands in order to qualify for monetary compensations.

The foregoing and other objects, features, and advantages of the invention will become more apparent from the following detailed description, which proceeds with reference to the accompanying figures.

DETAILED DESCRIPTION

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level abstractions of the actual operations that are performed. The actual operations that correspond to these terms may vary depending on the particular implementation and are readily discernible by one of ordinary skill in the art.

Implementation of the Systems and Methods Disclosed Herein

The systems may be implemented or performed by software stored on one or more tangible computer-readable media (e.g., one or more optical media discs, volatile memory or storage components (such as DRAM or SRAM), or non-volatile memory or storage components (such as hard drives)) and executed on one or more computing systems. The computing systems can include one or more central processing units (CPUs) and a memory, such as random access memory (RAM) for temporary storage of information and/or a read only memory (ROM) for permanent storage of information, and a mass storage device, such as a hard drive, diskette, or optical media storage device. Typically, the modules of the computing system are connected to the computer using a standards-based bus system, such as, for example, Peripheral Component Interconnect (PCI), Microchannel, SCSI, Industrial Standard Architecture (ISA) and Extended ISA (EISA) architectures. The computing system may also include one or more commonly available input/output (I/O) devices and interfaces, such as a keyboard, a mouse, and/or a touchpad. In one embodiment, the I/O devices and interfaces include one or more display devices, such as a monitor, that allows the visual presentation of data to a user. More particularly, a display device provides for the presentation of Graphical User Interfaces (GUIs), application software data, and multimedia presentations, for example. The computing system may also provide a communications interface to various external devices.

Such software can be executed on a single computer or on a networked computer (e.g., via the Internet, a wide-area network, a local-area network, a client-server network, or other such network). The systems and methods disclosed herein can also be performed using cloud computing, a form of Internet-based computing, whereby shared resources, software and information are provided to computers and other devices on-demand. The software embodiments disclosed herein can be described in the general context of computer-executable instructions, such as those included in program modules, which can be executed in a computing environment on a target real or virtual processor. The computing system may run on a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The computing system is generally controlled and coordinated by operating system software. Conventional operating systems control and schedule computer processes for execution, perform memory management, provide file system, networking, and I/O services, and provide a user interface, such as a graphical user interface, among other things.

Furthermore, any of the software embodiments (comprising, for example, computer-executable instructions for causing a computer to perform any of the disclosed methods) can be transmitted, received, or accessed through a suitable communication means. Similarly, any data structure, data file, intermediate result, or final result created or modified using any of the disclosed methods can be transmitted, received, or accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means now known or unknown. Moreover, any data structure, data file, intermediate result, or final result produced by any of the disclosed methods can be displayed to a user using a suitable display device (e.g., a computer monitor or display). Such displaying can be performed as part of a computer-implemented method of performing any of the disclosed methods.

Figure 1:
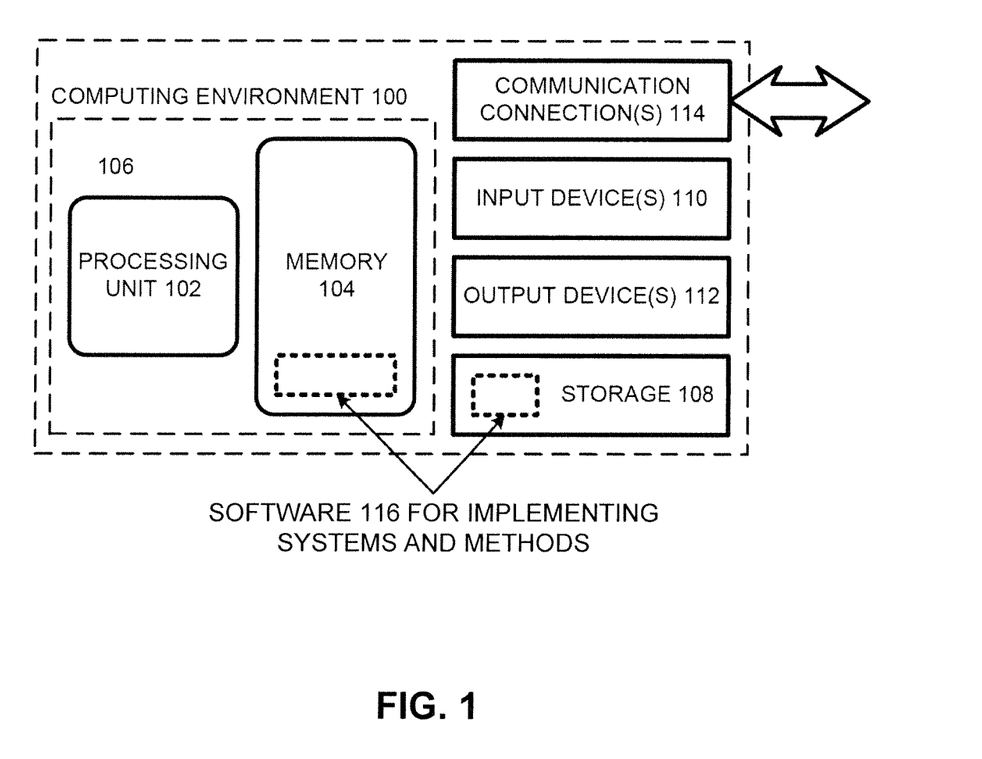
FIG. 1 is a schematic block diagram of an exemplary computing system on which certain embodiments of the systems and methods disclosed herein can be implemented.

FIG. 1 illustrates a generalized example of a suitable computing environment 100 in which several of the described embodiments can be implemented. The computing environment 100 is not intended to suggest any limitation as to scope of use or functionality, as the methods described herein can be implemented in diverse general-purpose or special-purpose computing environments.

With reference to FIG. 1, the computing environment 100 includes at least one processing unit 102 and memory 104. In FIG. 1, this most basic configuration 106 is included within a dashed line. The processing unit 102 executes computer-executable instructions and may be a real or a virtual processor. In a multi-processing system, multiple processing units execute computer-executable instructions to increase processing power. The memory 104 may be volatile memory (e.g., registers, cache, RAM), non-volatile memory (e.g., ROM, EEPROM, flash memory, etc.), or some combination of the two. The memory 104 stores software 116 implementing one or more of the systems described herein.

The computing environment may have additional features. For example, the computing environment 100 includes storage 108, one or more input devices 110, one or more output devices 112, and one or more communication connections 114. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 108 may be removable or non-removable, and includes magnetic disks, magnetic tapes or cassettes, CD-ROMs, DVDs, or any other medium which can be used to store information and which can be accessed within the computing environment 100. The storage 108 can store instructions for the software 116 implementing any of the described systems and methods.

The input device(s) 110 can be a touch input device such as a keyboard, mouse, pen, or trackball, a voice input device, a scanning device, or another device that provides input to the computing environment 100. For audio or video encoding, the input device(s) 110 can be a sound card, video card, TV tuner card, or similar device that accepts audio or video input in analog or digital form, or a CD-ROM or CD-RW that reads audio or video samples into the computing environment 100. The output device(s) 112 can be a display, printer, speaker, CD-writer, or another device that provides output from the computing environment 100.

The communication connection(s) 114 enable communication over a communication medium to another computing entity. The communication medium is not a storage medium but conveys information such as computer-executable instructions, resource and construction project information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods disclosed herein can be described in the general context of computer-readable media. Computer-readable media are any available media that can be accessed within or by a computing environment. By way of example, and not limitation, with the computing environment 100, computer-readable media include tangible computer-readable storage media such as memory 104 and storage 108.

Figure 2:
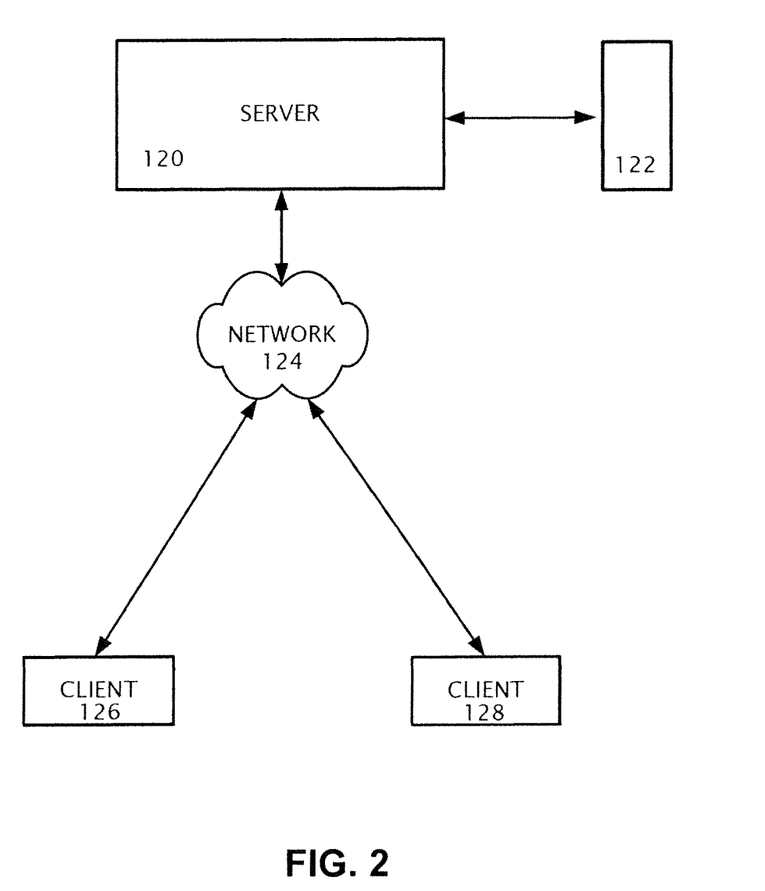
FIG. 2 is a block diagram illustrating a computer network that can be used to perform at least some of the embodiments of the systems and methods disclosed herein.

Any of the aspects of the technology described herein can also be performed using a distributed computer network. FIG. 2 shows a simplified embodiment of one such exemplary network. A server computer 120 can have an associated storage device 122 (internal or external to the server computer). For example, the server computer 120 can be configured to perform the calculations and analysis of information according to any of the disclosed embodiments. The server computer 120 can be coupled to a network, shown generally at 124, which can comprise, for example, a wide-area network, a local-area network, a client-server network, the Internet, or other such network. One or more client computers, such as those shown at 126, 128, may be coupled to the network 124 using a network protocol. The work may also be performed on a single, dedicated workstation, which has its own memory and one or more CPUs.

Figure 3:
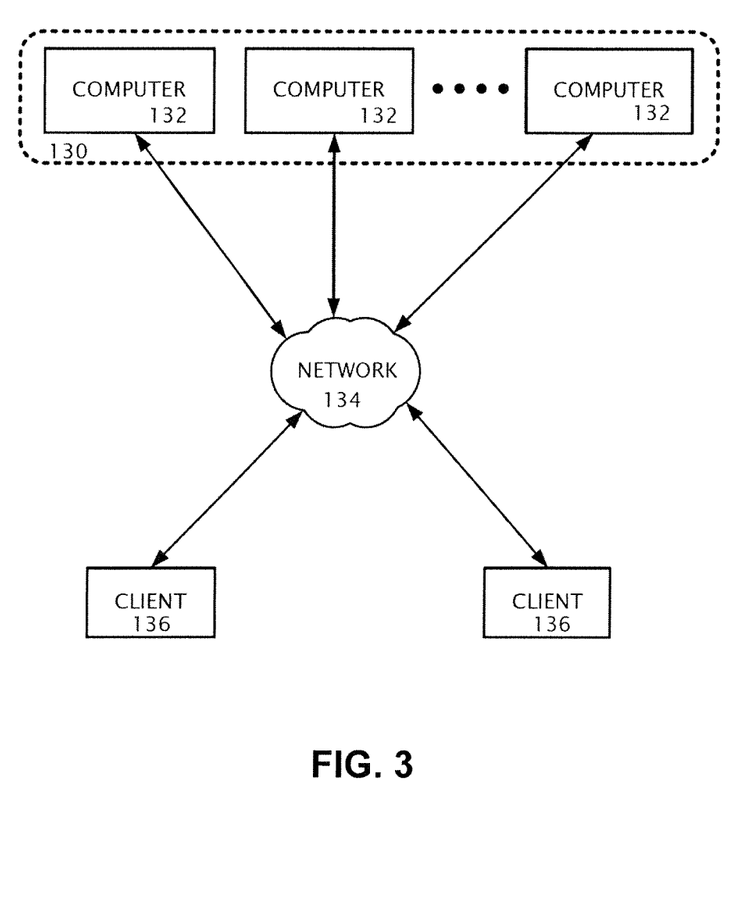
FIG. 3 is a block diagram illustrating another computer network that can be used to perform at least some of the embodiments of the systems and methods disclosed herein.

FIG. 3 shows another exemplary network. One or more computers 132 communicate via a network 1304 and form a computing environment 130 (e.g., a distributed computing environment). Each of the computers 132 in the computing environment 130 can be used to perform at least a portion of the calculation techniques according to any of the disclosed embodiments. The network 134 in the illustrated embodiment is also coupled to one or more client computers 136.

Figure 4:
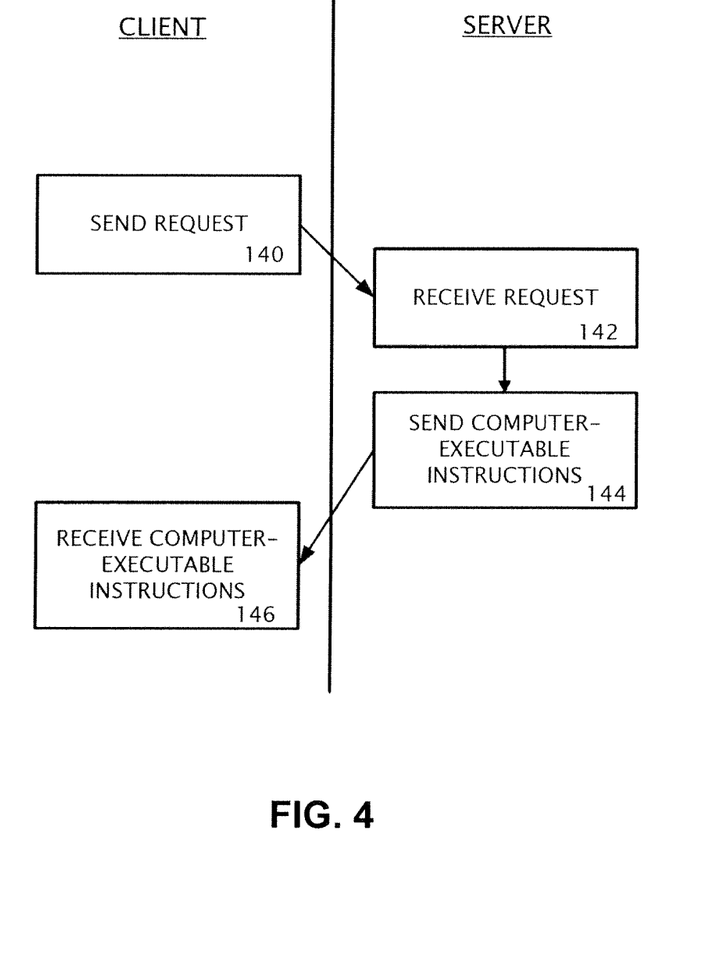
FIG. 4 is a block diagram illustrating how the computer networks of FIG. 2 or 3 can be used to perform certain aspects of the systems and methods disclosed herein.

FIG. 4 shows one exemplary manner in which computer-executable instructions for performing any of the disclosed embodiments can be transmitted, accessed, or received using a remote server computer (such as the server computer 120 shown in FIG. 2) or a remote computing environment (such as the computing environment 130 shown in FIG. 3). At process block 140, for example, the client computer sends a request to download computer-executable instructions for performing any of the disclosed methods or techniques (e.g., after registering or logging in to the system). In process block 142, the request is received by the remote server or by respective components of the remote computing environment. In process block 144, the remote server or computing environment transmits computer-executable instructions for performing any of the disclosed methods or techniques. At 146, the computer-executable instructions are received (e.g., stored, buffered, and/or executed) by the client computer.

Methods and Systems of Monetary Distribution Based on Behavioral Demographics

Figure 5:
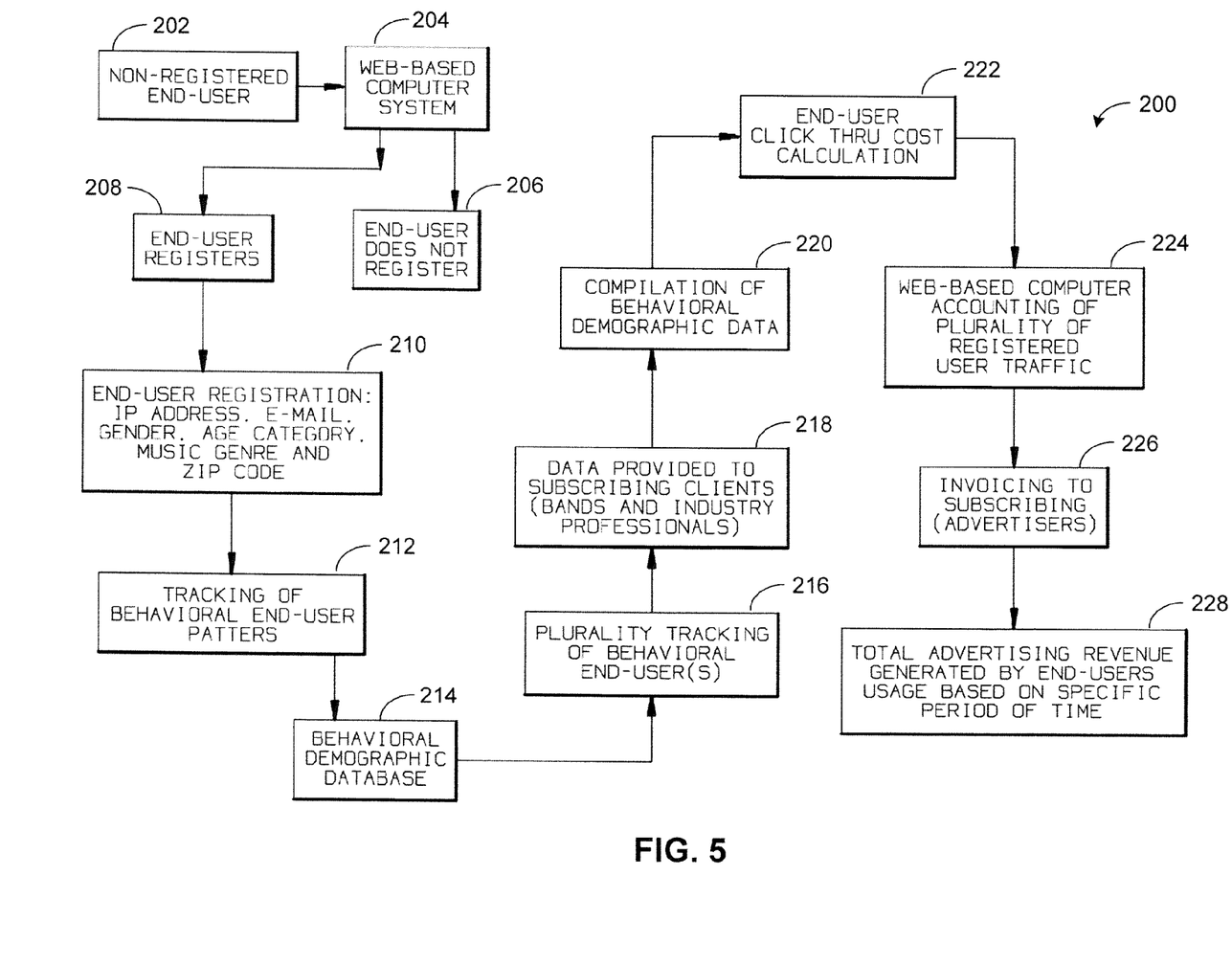
FIG. 5 is a flow chart illustrating an exemplary embodiment of a method of tracking and providing monetary distributions based on behavioral demographics.
Figure 6:
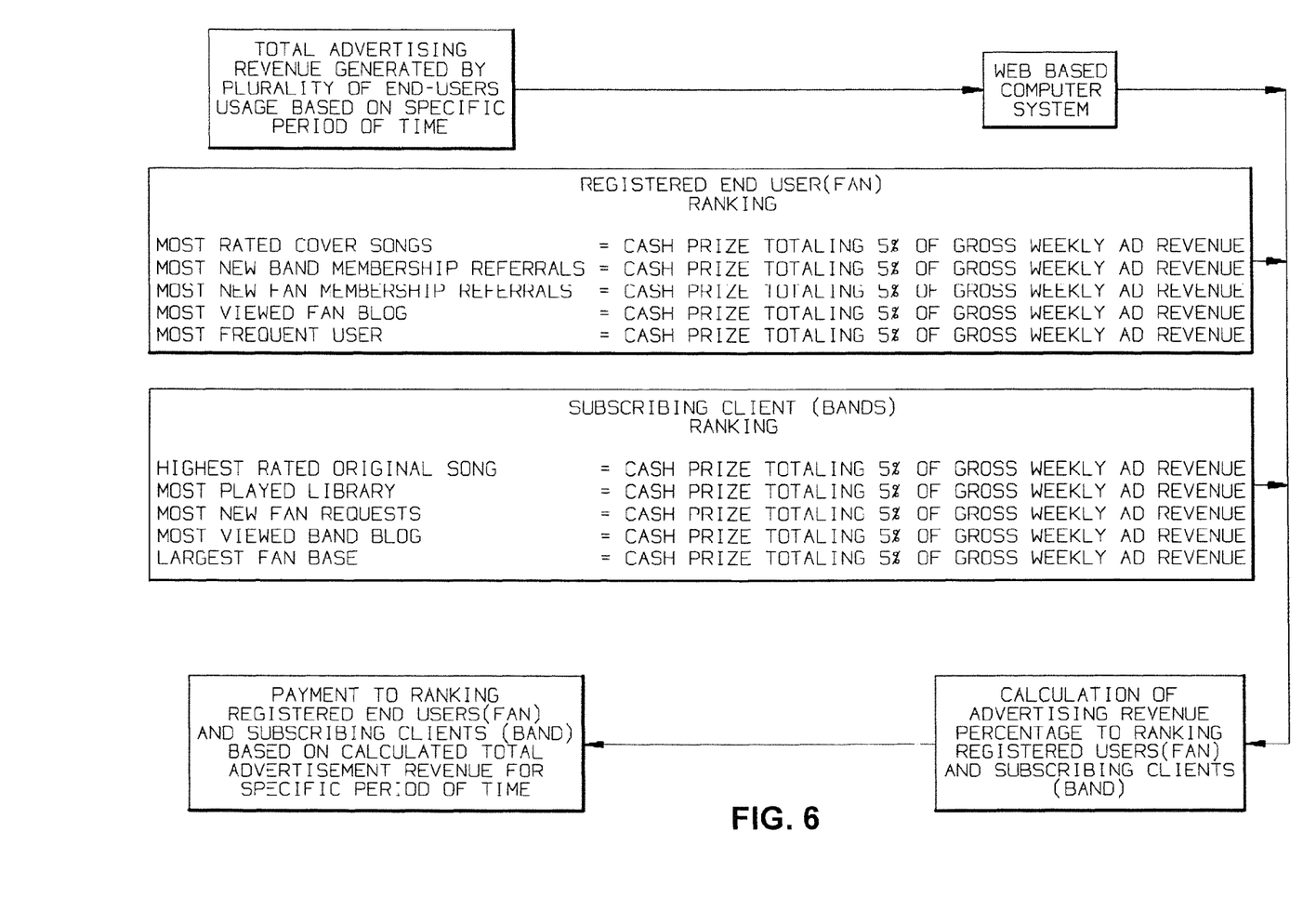
FIG. 6 is a flow chart illustrating another exemplary embodiment of a method of tracking and providing monetary distributions based on behavioral demographics.
Figure 7:
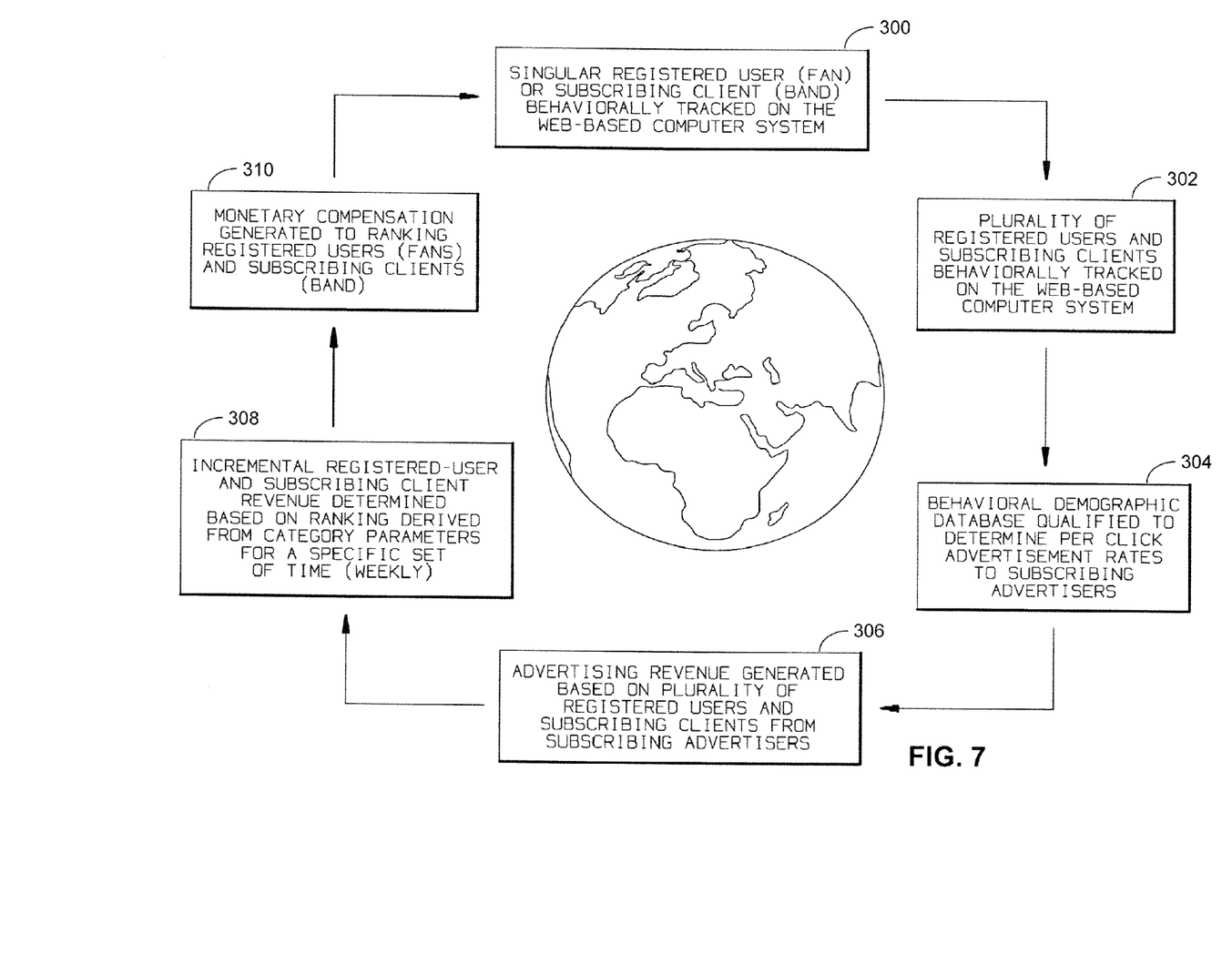
FIG. 7 is a flow chart illustrating a further exemplary embodiment of a method of tracking and providing monetary distributions based on behavioral demographics.

One embodiment of the present disclosure generally relates to electronic commerce. Referring to FIGS. 5-7, systems and methods for registering users with a system and tracking their behavioral patterns in order to determine and provide rewards in accordance to a user's interaction behavior with a computer system.

In a first embodiment, the behavioral patterns that are determined and analyzed are related, at least in part, to musical preferences and interests. Accordingly, users of the system can be fans of music and subscribers of the system can be bands or others associated with bands (e.g., record labels, managers, etc.). In other embodiments, third-party advertisers can also subscribe to the system and can track and/or monitor the actions and behaviors of the registered users.

Registration, Subscription, and Creation of Behavioral Database

In order to accomplish the methods disclosed in FIGS. 5-7, both users and subscribers must be registered with the system. Referring to FIG. 5, a method 200 for registering a user with a system is provided. For example, the system can register a user by exchanging information between a client computer (e.g., the user's computer) and a server, as described above with respect to FIGS. 2-4.

As shown in FIG. 5, in steps 202 and 204, a non-registered user can interact with a web-based computer system. If the non-registered user does not register with the system (as shown in step 206), the non-registered user cannot participate in the system further. In some embodiments (not shown), the non-registered user may be permitted to have limited participation with the system. However, in order to be able to provide a subscriber with the desired behavioral information and/or data, each user should register with the system and provide at least a small amount of personal information.

Referring to steps 210 and 212 in FIG. 5, a user database can be created containing behavioral demographic profile information of the plurality of registered users, including demographic profile information for each registered user, to include each registered user's zip code, city, country, user name, user password, user email address, gender, and age-bracket.

Although not shown, subscribers can register with the system in the same or a similar manner, by providing, for example, at least contact information along with a user name and password so that they can access the system resources as described in more detail below.

The plurality of registered users enable the web-based computer system to attract web-specific advertisers based on the volume of registered users collectively, through the frequency of use by the registered users on the web-based computer system. The behavioral demographic database allows subscribing clients to track and quantify the behavioral patterns of a registered user by location specific methodology to target products and services specific to the registered end-user. Thus, as shown in steps 216, 218, and 220, a plurality of registered users actions and/or behaviors within the system can be tracked (step 216), the collected data can be provided to subscribing clients (step 218), and/or the data of each user can be compiled to provide a compilation of behavior demographic data for use by the system and/or subscribers. Access to the behavioral demographic information and collected consumer preference information can be provided to subscribers via the system.

Revenue, Ranking, and Rewards

In some embodiments, the web-based computer system can derive advertising revenue based on the plurality of registered users and frequency of usage for a set period of time. In addition, a percentage allocation of advertising revenue derived from the web-based computer system accumulates from the plurality of registered user(s) usage for a set period of time.

Users of the system can also receive rewards or other compensation for their actions as a registered user. For example, the frequency of usage from a single registered user can be quantified based on a ranking system that tracks registered users for a repeatable set of time. The web-based computer system can determine a monetary compensation amount that is awarded to each ranking registered user based on the gross advertising revenue derived from a set period of time on a percentage basis and compensates the top rank individual end-user(s) in each ranking category with a percentage of the gross advertising revenue derived from the web-based computer system during a set period of time.

Referring to FIG. 5, steps 222, 224, 226, and 228 illustrate a method for determining calculating rewards that can be provided to a user. For example, step 222 provides a step for calculating rewards earned by a registered user by "clicking-through" designated areas or sites. Step 224 provides for a means to determine rewards earned by a plurality of registered users based on their actions or behaviors. Step 226 provides a means for invoicing subscribers for the rewards earned by users. As noted above, the subscribers can comprise bands (or related parties) or third-party advertisers utilizing the system to market various products or services. Finally, step 228 provides a step for calculating total advertising revenue generated over a period of time.

Referring to FIG. 6, further details regarding methods of accounting for rewards payable to registered users and other expenses and costs attributed to subscribers are provided. For example, registered users can be ranked based on the number of rated songs, band membership referrals, new registered referrals, most viewed fan blog, most frequent user, etc. These and other rankings can be associated with a cash prize or reward as shown in FIG. 6. Similarly, bands can also be provided with rewards (e.g., cash or other incentives) for utilizing the service. For example, the band (or musical artist) with the highest rated original song, most played library, most new fan requests, most viewed band log, largest fan base, etc., can receive a reward as shown in FIG. 6. Based on the total advertising revenue generated, the rewards can be calculated and rewards can be distributed to registered users and/or bands.

FIG. 7 illustrates the advantages and interrelationship of the system relative to the acts and behaviors of the registered users and subscribers. For example, step 300 illustrates that the acts of registering users and subscribers allows for those registered users to be tracked on the system. Steps 302 and 304 illustrate that with the registration of a plurality of users and subscribers a behavioral database can be generated and the registered users' behavioral patterns can be monitored by the subscribing clients.

Step 306 illustrates that advertising revenue can be generated based from subscribers, including, in some cases, subscribing third-party advertisers. Step 308 illustrates the ranking ability of the site to rank both users and subscribers (e.g., bands). By ranking the registered user (e.g., fan) frequency and usage, the highest ranking individual end user(s) can receive a percentage of the Website advertising revenue as a reward for their actions. Thus, for example, as shown in step 310, monetary compensation can be generated and distributed to ranking users and subscribers.

Additional Benefits to Registered Users and Subscribers

By ranking a registered user's (e.g., fan) frequency and usage of the system, subscribing clients can monitor their respective band demographics for a set period of time. In addition, both users (e.g., fans) and subscribers (e.g., bands) can receive a percentage of the website advertising revenue. Thus, the registered user (e.g., fan) can monitor their respective ranking for a set period of time and receive a percentage of the website advertising revenue, based on the ranking of that individual relative to plurality of registered users.

Registered users benefits can include customizable home pages, customized song libraries, band tracking album launches and tour dates. In some embodiments, the registered users (e.g., fans) will be able to listen to new music, monitor new songs, rate new music, and allow registered users to monetize their efforts through the allocation of a percentage of the overall website advertising revenue.

Subscribing clients (e.g., record labels, etc.) can monitor a band's particular fan-base, song play frequency and geographical demographics to determine the viability of offering a record contract to a specific band. Certain subscribers that are industry professional(s) (e.g., record labels, managers, etc.) can benefit by monitoring any band's/musician's fan base, per-song listening trends, frequency and individualize their talent search criteria to match their music genre preference and geographical market area(s) respectively.

Bands and musical artists can benefit by monitoring their respective fan-based tracking demographically and geographically with unique and customizable, real time reporting data. Tangible demographics will include registered member's age-bracket, gender, email and music preferences, location, and listener trends per song or video.

Subscribing clients (e.g., bands) can utilize the geographically based demographics to promote their respective fan-base to industrial professionals or tailor their road-show and/or promotional tour(s) according to their geographical fan-base.

These systems and processes also permit advertisers to target behaviorally-based product placement of musically affiliated products and services to Geo-targeted end-users. Live venues can increase ticket sales by correlating band bookings of a respective bands' fan base by quantifying their geographical distance to the venue. Live venues can also utilize the geographically based demographics of a band's respective fan-base to determine the suitability of booking a particular band.

Accordingly, the disclosed methods and systems described herein may have many real world applications by providing consumers with a tangible means of monetizing their respective usage on a computer system through the allocation of web-based advertising revenue that may be utilized in a number of online fields, such as music, travel, gaming, search engine, and social networking sector, etc.

Customer-Based Selection of Commercial Content for Inclusion with Media Files

In another embodiment, methods and systems for distributing media files are provided. As used herein, "media file" refers to any musical or artistic piece that can be stored in a digital format. For example, a digital media file can comprise an audio file, a video file, or both an audio file and a video file.

Commercial content (also referred to herein as commercial messages) can be associated with the media file in any known manner. For example, by way of a non-limiting example, the commercial content can be attached to, combined with, and/or otherwise embedded within the media file. In some embodiments, the commercial content is in the same format as the musical or artistic piece contained in the media file. Thus, for example, the media file can comprise an mp3 audio file and the commercial content can comprise an mp3 audio file, and these two audio files can be associated. In other embodiments, the commercial content can be in a different format than the musical or artistic piece contained in the media file. In such cases, one of the two different files can be converted to the type of file of the other file, or the two files can simply be associated together in different formats. Thus, for example, an audio file can be associated with a video file, and vice versa.

The media file, along with the commercial content, can be distributed to customers, such as registered or unregistered users of a system. In some embodiments, the registered users can comprise the registered users of the system described above. As used herein, the term "customer" refers to any person or group that receives a distribution of the media file with the commercial content and/or any person or group involved in the selection of the commercial content for inclusion with a media file in the manners described herein.

The commercial content can be a brief audio and/or video commercial that can be played back while listening to and/or viewing the media file. The commercial content can be provided at the beginning, middle, and/or end of the media file (i.e., the non-commercial content). In one embodiment, playback of the commercial content does not exceed 20 seconds. More preferably, playback of the commercial content does not exceed 15 seconds and, even more preferably, playback of the commercial content is about 10 seconds or less. For example, if the media file is a digital audio file that contains a song, an audio commercial can be attached or imbedded so that it will be played back before, during, or after the song portion of the audio file.

Figure 8A:
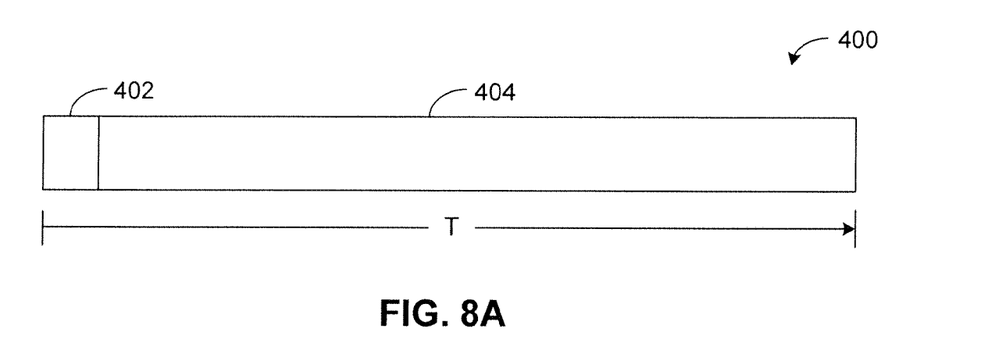
FIG. 8A illustrates an embodiment of a song file that comprises non-commercial content and commercial content.
Figure 8B:
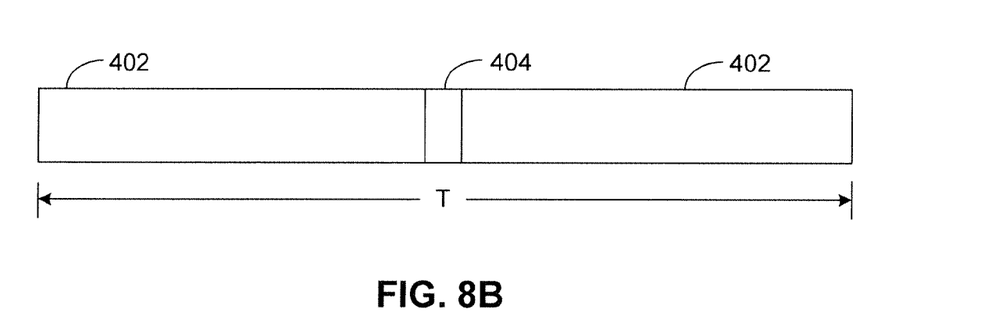
FIG. 8B illustrates an embodiment of a song file that comprises non-commercial content and commercial content.
Figure 8C:
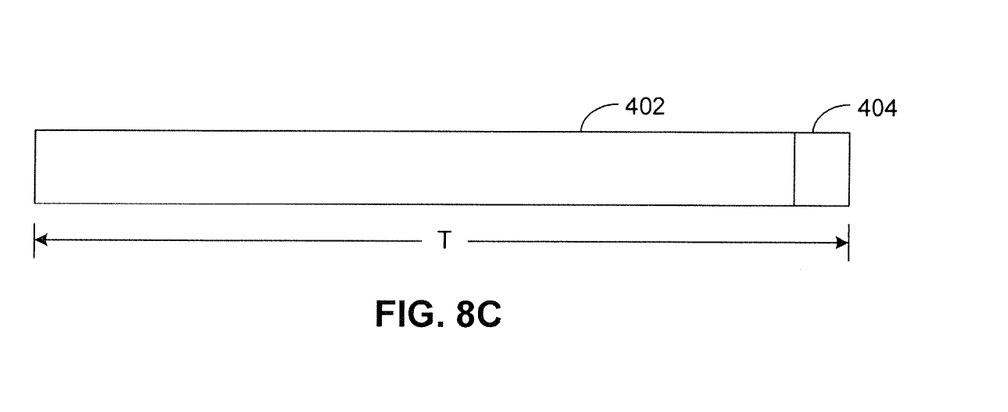
FIG. 8C illustrates an embodiment of a song file that comprises non-commercial content and commercial content.

FIGS. 8A, 8B, and 8C illustrate embodiments of song files 400 that, when played back over a period T, comprise non-commercial content 402 and commercial content 404. The commercial content 404 is attached and/or embedded to be played back before the non-commercial content 402 (FIG. 8A), in the middle of the non-commercial content 402 (FIG. 8B), or at the end of the non-commercial content 402 (FIG. 8C).

In some embodiments, the media file (with commercial content) can be delivered to a customer via the Internet as a download. In other embodiments, it can be delivered to the customer as a streaming file. Other delivery methods can be used as well, for example, the media file (with commercial content) can be delivered to other audio or video playback systems, including, for example, handheld devices such as smartphones, gaming devices such as an X-Box®, devices configured to receive and playback audio or video files, such as a TiVo® or DVR, and/or any other device that interconnects in some fashion with the Internet.

Selection of Commercial Content

In one embodiment, the commercial content can be selected, at least in part, by the customers. By allowing customers who will be downloading or obtaining a copy of the media file to select the desired commercial content, at least two major advantages are realized. First, because the customer has selected the commercial, he or she will be much more likely to listen to the commercial message during playback. Second, the selection of the commercial message by customers can be conveyed to those that have produced, prepared, and/or otherwise created the commercial message. This information can be very important to the commercial creator since by selecting a commercial message for inclusion with a media file, the customer is also indicating that he or she prefers the product and/or commercial message presented in commercial content more than the other possible selections.

Figure 9:
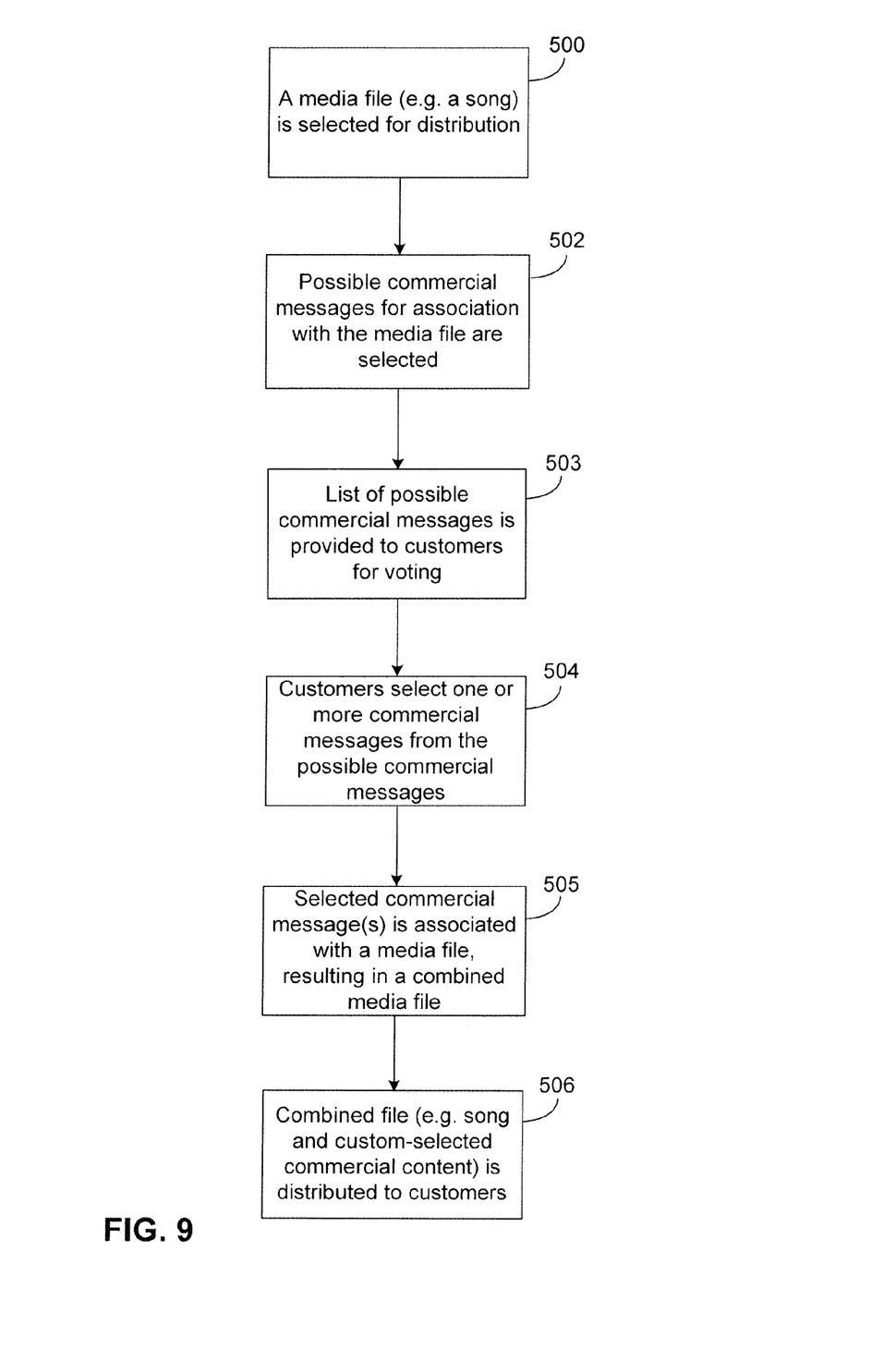
FIG. 9 illustrates a flow chart of an embodiment for providing and distributing media files with commercial content that is, at least in part, selected by customers.

FIG. 9 illustrates a flow chart for providing fan-selected commercial messages with a media file for distribution. Referring to step 500, a media file can be selected. For example, a musical artist (e.g., a band, singer, musician, etc.) such as "Band A" can select a song that they would like to make available for distribution.

In step 502, a list of possible commercial messages that can be included with the song is identified. The list of possible commercial messages can be selected in various ways. For example, in one embodiment, the list of possible commercial messages can be selected by Band A. In another embodiment, the list of commercial messages can be selected by a third-party, such as an advertiser that is sponsoring and/or paying for the free distribution of the song with commercial content. In other embodiments, the list of potential commercial messages can be selected by customers (e.g., fans).

In step 503, a list or other identification of the possible commercial messages are provided to the customers for voting. Step 504 of FIG. 9 allows customers to vote on the commercial content that will be provided with the song when that song is distributed. In some embodiments, voting to select the commercial content can be limited to fans of the band. Limiting voting to fans can be achieved by requiring registration of users (i.e., such as is described above in other embodiments) and/or requiring a registered user to otherwise identify him or herself as a "fan" of the band. Also, by limiting voting to fans of the band (e.g., fans of Band A), the fans can effectively vote on which product or service is the "best" for that particular band to associate itself with.

Once customers or fans select the commercial content that will be provided with the media file, a combined media file can be created in step 505. The combined media file includes the original media file and the selected commercial content. Once the combined media file is created, the combined media file can be provided for download as shown in step 506. The song can be made available for download to all customers. Alternatively, the song can be made available for download only to customers that are registered users, identified fans of the band (e.g., fans of Band A), and/or customers or fans that voted for the selection of the commercial. By limiting distribution of the song only to customers or fans that voted for the selection, voting for preferred commercial content can be encouraged by the system, thereby increasing the viewership of the commercial content.

In addition, by allowing customers (or fans) to vote for the commercial content, the customers are exposed to all commercials that are identified as possible selections for inclusion with the song. Accordingly, not only are customers exposed to the commercial content that they select for inclusion with the song file that they will receive by download (or streaming, etc.), they are also exposed to the commercial content that they do not select for attachment/embedding with the designated song. Moreover, once the final commercial is selected by the fan base there is a higher chance of "adoption" of the product or service by the fans who download the song.

Should the subject media file be greater than about five or ten minutes in length, such as a full length motion picture, the customers can be requested or asked to select several commercials that will be included, attached, and/or embedded in the motion picture at several locations. The commercials that are selected by the customers can appear in the motion picture much in the same way that commercials appear on broadcast television. Accordingly, in one embodiment, the fans of a motion picture director who is issuing a "straight to Internet" movie, or releasing a previously theatrical released movie to the internet, can allow his fan base to select from numerous potential commercials and the fan-selected commercials will be placed into the authorized, commercial bearing release of the movie. The same concept can be used for releases of podcasts, television shows, and any other entertainment based digital file of any nature.

Customer/Fan Incentives

The customers or fans can be rewarded in several ways that will encourage them to select commercial content and view the commercial content included with the distributed digital file. As described above, in some embodiments, the system can limit distribution of the digital media file that includes the commercial content to a customer or fan that votes on the commercial content.

In addition to and/or instead of any and all of the benefits described herein, any one or more of the following can be provided to customers or fans as a reward: (a) customers can be given the opportunity to earn media content (e.g., songs, movies, etc.), including commercial-free versions, (b) customers can achieve points within the system that can be used to obtain media content, cash rewards, or other benefits, (c) customers can earn cash rewards on an incremental cash basis. Thus, for example, in some embodiments, customers can earn cash rewards for watching media content that includes commercial content. In some embodiments, a customer can earn cash rewards (e.g., $0.01 or more, for example, $0.05 or $0.10) for each download and/or viewing of commercial content included with a media file. Thus, commercial content suppliers or distributers (e.g., advertisers) can provided a monetary reward or payment to both the producer of the media (e.g., an artist) and the viewer (e.g., the customer or fan) of the media with the embedded commercial message.

In other embodiments, customers can be invited to create their own commercials for authorized products and services. Customer-created commercial content can compete for rewards based on the quality and/or popularity of the customer-created commercial content. For example, if the digital file is an audio song and Coca-Cola® sponsors a commercial content contest, fans can be requested to submit their own audio version of their own original Coca-Cola® commercial that can be combined with the audio song. If a customer's commercial is selected by a popular vote by customers (or by fans of the selected audio song the band's fans if voting is restricted to fans) then that commercial will be combined with the audio song for distribution. Voting can take place using any known manner, including, for example, voting online, by cell phone, or by calling a certain phone number. The customer that created the commercial can receive a reward. The reward can include, for example, cash incentives, points or other tokens that can be used to receive additional songs for downloading (including songs without commercial content), and entries into one or more sweepstakes for additional prizes. In some embodiments, the submission of a customer-produced commercial itself can be rewarded.

In some embodiments, more than one customer/fan commercial can be selected. Thus, for example, if a song will be distributed to 10,000 customers, the first thousand digital releases of the song can have a commercial by Winner A, the next thousand digital releases of the song can have a commercial by Winner B, and so forth.

In some embodiments, the fan-based commercials can be interspersed with professionally created commercials as submitted by the sponsor (e.g., Coca-Cola Company®) or another relevant product or service provider. For example, one million free downloads of a new Madonna song can be distributed with each distributed version bearing a digital advertisement. Of those million downloads, half (e.g., 500,000) could include a professionally-produced commercial provided by Coca-Cola®, while the rest could have fan-created commercials produced by one or more winners selected by the popular vote of customers or fans.

Another example comprises embedding commercial content in a media file that contains a motion picture that is to be distributed to customers or fans. The commercial content embedded in the motion picture can include a mixture of fan-created audio/video commercials that tout a selected product or service offered by a major company. It should be understood that the commercial content provided with the motion picture can be entirely fan-based commercial content or it can only partially include fan-based commercial content.

Other rewards for customers or fans can include providing the customer/fan with points that can be used to obtain copies of media file without commercial content. For example, the system can be configured so that any fan who downloads and listens to a song with commercial content embedded therein, or watches a movie with one or more commercials embedded therein, shall earn a point towards obtaining a free, non-commercial version of the song or movie. Such points can also be rewarded by watching or listening directly to commercials whether or not they are embedded or contained in other non-commercial content.

Points that are awarded for such viewing or listening behavior can be tracked in various ways. In some embodiments, a code can be embedded in the commercial content. For example, if in a song, the code can be embedded in the commercial included with the song. If in a movie, the code can be embedded in one or more of the commercials, or in one of more of the non-commercial scenes of the movie, so that the viewer cannot fast forward to the location of the code.

When the code is triggered during the play of the movie or song, the code can cause a report to issue to a server that records the information that the particular viewer has heard or seen the commercial content. Information sent to the server can include the user's registered information (e.g., name, age and other demographical information as described in other embodiments herein), as well as the user's IP, operating system, browser, etc.

The number of viewings of the commercial content can be set so that the viewer has to experience the commercial a set number of times. For example, a Free-Content Viewing Number can be set to be between 1-100 times. Once the Free-Content Viewing Number is reached (i.e., once the customer has watched the commercial content in free digital file the required number of times), the customer can receive a code to download a free digital copy of the content that does not bear commercials.

Fans may also be rewarded, such as by receiving points within the system for forwarding a copy of the commercial laden digital file to friends. To obtain credit for introducing a friend to a free commercial version of a digital file (e.g., an audio song or motion picture with commercial content embedded therein), a customer can log into the system or use a tool (e.g., software) provided for use with a portable digital device, and enter their friend's email address. The friend can then download the free digital file with the embedded commercial content. The number of "friends" who download the material is collected. A set number of points can be awarded to the customer who referred the friends and/or a cash award (e.g., one cent or more) can be awarded.

Payment of cash awards or redemption of points can be withheld until a certain minimum milestone amount (such as ten dollars or 1000 points) is earned by the person forwarding copies to friends. In some embodiments, the payment can be earned only when the person listening to the song or watching the movie is exposed to the commercial content and the system reports that the person viewed the commercial content. This may be set to a certain minimum number of viewings if so desired. It may also be set so that the fee is not earned by the original sender unless the recipient also forwards the file to a certain number of other users who view the commercial. Alternatively, the fee can be increased for a user who forwards the digital file to another person who, in turn, forwards the digital file to others. In this manner, a portion of the earnings derived from secondary viewings can flow upwards to the original sender.

In addition to, or in lieu of, earning cash based on the number of friends that a digital file with commercial content is sent to, a customer can also earn various discounts, coupons, vouchers and other non-cash consideration for forwarding and/or further distributing the digital file. For example, a sender who has sent out 100 copies to friends and who's friends have been exposed to the commercial content (e.g., by automatically verification as described above), could earn a coupon for discounted services or products, such as a half-price dinner at a local restaurant. Since the physical area of where the sender is located is known (either through the registration process or through automatically determining the IP address that the customer is using), the discounts, coupons, etc., can be specifically tailored to an individual customer. For example, discounts/coupons/vouchers can be provided to the user for services or products available in his or her geographic area.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A non-transitory computer readable medium having stored thereon a method for providing rewards to customers for supporting commercial messages, the method comprising:

registering a plurality of customers by obtaining personal information, geographic information, or both personal and geographic information about each customer and associating that information with a unique username;

providing a voting forum for the registered customers to vote on their preferred commercial messages;

receiving votes from the registered customers, each vote reflecting a customer's preference for one of a plurality of commercial messages;

calculating the votes;

designating a preferred commercial message based on the calculation;

associating the preferred commercial message with a media file to create a combined media file;

making the combined media file available for free distribution;

distributing the combined media file to one or more of the registered customers;

allowing the registered user to forward the combined media file to unregistered users;

tracking whether the unregistered users view the commercial message; and providing a reward to each customer that forwarded the combined media file to unregistered users that viewed the commercial message.

2. The non-transitory computer readable medium of claim 1, wherein the media file and the commercial messages comprise audio files.

3. The non-transitory computer readable medium method of claim 1, wherein the media file and the commercial messages comprise video files.

4. The non-transitory computer readable medium of claim 1, wherein the plurality of commercial messages comprise commercial messages created by one or more of the registered customers.

5. The non-transitory computer readable medium of claim 1, further comprising:

distributing the combined media file to one or more of the registered customers;

calculating a number of viewings of the commercial message by the one or more registered customers; and providing a reward to the one or more registered customers after they have viewed the commercial message a predetermined amount of times.

6. The non-transitory computer readable medium of claim 5, wherein the reward comprises:

providing the one or more registered customers with free copies of the media file without the commercial message.

* * * * *